United States Patent
Goetting et al.

(10) Patent No.: US 11,870,376 B2
(45) Date of Patent: Jan. 9, 2024

(54) METHOD AND DEVICE FOR CALIBRATING AN OFFSET ANGLE

(71) Applicant: Robert Bosch GmbH, Stuttgart (DE)

(72) Inventors: Gunther Goetting, Stuttgart (DE); Yuping Chen, Markgroeningen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/779,334

(22) PCT Filed: Oct. 21, 2020

(86) PCT No.: PCT/EP2020/079547
§ 371 (c)(1),
(2) Date: May 24, 2022

(87) PCT Pub. No.: WO2021/104752
PCT Pub. Date: Jun. 3, 2021

(65) Prior Publication Data
US 2022/0407443 A1  Dec. 22, 2022

(30) Foreign Application Priority Data
Nov. 29, 2019 (DE) .................. 10 2019 218 526.6

(51) Int. Cl.
*H02P 21/00* (2016.01)
*H02P 21/18* (2016.01)
*H02P 21/10* (2016.01)

(52) U.S. Cl.
CPC .............. *H02P 21/18* (2016.02); *H02P 21/10* (2013.01)

(58) Field of Classification Search
CPC .. H02P 21/18; H02P 21/10; H02P 6/16; H02P 6/08
See application file for complete search history.

(56) References Cited

U.S. PATENT DOCUMENTS

2010/0253258 A1   10/2010   Fabis et al.

FOREIGN PATENT DOCUMENTS

| DE | 102008001408 A1 | 10/2009 |
|---|---|---|
| DE | 102015218132 A1 | 3/2017 |
| DE | 102019124926 A1 * | 3/2020 |
| DE | 102021200182 A1 * | 7/2022 |
| EP | 0784378 A2 | 7/1997 |
| EP | 3223421 A1 | 9/2017 |

OTHER PUBLICATIONS

Translation of International Search Report for Application No. PCT/EP2020/079547 dated Jan. 11, 2021 (2 pages).

* cited by examiner

*Primary Examiner* — Karen Masih
(74) *Attorney, Agent, or Firm* — Michael Best & Friedrich LLP

(57) ABSTRACT

A method (100) for calibrating an offset angle (PhiO) for field-oriented control of an electric machine (210) between an angle signal (W) of a position encoder (220) and the direction of the rotor flux (RF), having the steps of: periodically varying (120) a current vector (Is) along a line of constant torque; ascertaining (130) a speed signal (n_t) of the position encoder (220) of the electric machine (210); calibrating (140) the offset angle (PhiO) on the basis of the ascertained speed signal (n_t).

9 Claims, 4 Drawing Sheets

METHOD AND DEVICE FOR CALIBRATING AN OFFSET ANGLE

BACKGROUND OF THE INVENTION

The invention relates to a method and a device for calibrating an offset angle of a field-oriented control of an electric machine. The invention further relates to a drivetrain with a corresponding device and a vehicle with a drivetrain as well as a computer program and a computer-readable storage medium.

In electric and hybrid vehicles, electric machines, preferably synchronous machines, are frequently used as traction or drive machines. To be able to control the drive torque with the required accuracy, the precise position of the rotor flux must be known to a drive control unit. Since the position of the rotor flux is tightly coupled to the position of the rotor, the flux direction can, in principle, be ascertained from the mechanical positional angle. The acquisition of this mechanical positional angle is usually done here with a position encoder, preferably a resolver or an incremental encoder, or another device. It is necessary, in addition to the mechanical angle, for what is known as an offset angle, which represents the difference, i.e. the offset, between the zero position of the sensor and the direction of the rotor flux to be known in the drive control unit. Different approaches to ascertaining this offset are known from the prior art. For example, document DE 10 2008 001 408 A1 discloses a method for determining an offset angle of an electric machine. The offset angle is ascertained as a function of the difference between a field angle of an impressed stator magnetic field and an ascertained sensor angle. There is a need for methods and devices for calibrating the offset angle.

SUMMARY OF THE INVENTION

A method is provided for calibrating an offset angle of a field-oriented control of an electric machine between an angle signal of an angle transducer of an electric machine and the direction of the rotor flux. The method comprises the following steps: periodically varying a current vector along a line of constant torque, preferably in a d/q coordinate system of the field-oriented control; ascertaining a speed signal of the electric machine; calibrating the offset angle depending on the ascertained speed signal.

Field-oriented controllers of electric machines are known. Alternating values (such as alternating voltages and alternating currents) that are assumed to be largely sinusoidal are not here directly controlled in their instantaneous temporal value, but in an instantaneous value freed from the phase angle within the period. The acquired alternating values are each transferred for this purpose into a coordinate system that rotates with the frequency of the alternating values. When the electric machine is in steady-state operation, constant values are then obtained from the alternating values within the rotating coordinate system, to which constant values it is possible to apply all standard control methods. Position encoders that output an angle signal for determining the rotor relative to the stator are used to determine the position of the rotor. In operation of the electric machine, a rotating magnetic field results from the multiphase, phase-offset alternating currents impressed into the stator. The direction of this rotating magnetic field corresponds to the direction of the resulting total flux that arises from the overlay of the rotor flux generated by the permanent magnets and the stator flux generated by the stator currents. An accurate knowledge of the deviation, i.e. of the offset angle, between the angle signal and the true rotor flux direction is important for the control, since the rotor flux direction is calculated from the angle signal and the offset angle for the control of the electric machine, i.e. the specification of the stator current. Within the rotating coordinate system, the d/q coordinate system that rotates synchronously with the rotor flux and whose d-axis points in the direction of the rotor flux, a stator current is represented as a stator current vector that is characterized by its amplitude and its direction. This current vector rotates synchronously with the rotating stator or rotor flux of the electric machine. In the d/q coordinate system the current vector can be decomposed into two components, Isd and Isq which, in the stationary case, are of equal magnitude. Machine-specific lines can be represented in this coordinate system, along which the electric machine outputs a constant torque. A controller of an electric machine can access the parameters of these lines by means of characteristic diagrams or parameterized data. The different operating points of these lines can be set by means of varying the stator current vector with different Isd and Isq components. In one step of the method, the operating points are set along this line of constant torque by means of periodic variation of the current vector, preferably of its amplitude and/or direction. An electric machine that can be connected to the controller is thus operated at these operating points. If the offset angle assumed by the controller is correct, the torque output by the electric machine remains constant, and so also therefore does the rotation speed of the electric machine. If the assumed offset angle is incorrect, the operating points that are actually set are located next to the lines of constant torque. A periodic oscillation of the torque occurs and causes a periodic oscillation in the rotation speed of the electric machine. In a further step, the resulting rotation speed, or the rotation speed profile, is ascertained as a speed signal. The speed signal is preferably ascertained from the angle signal of the position encoder. The offset angle is calibrated depending on the speed signal. The amplitude of the offset angle is preferably varied for this purpose, until an amplitude of the speed signal during the variation of the current vector falls below a threshold value. The offset angle obtained in this way is a good approximation to the true value. The calibration of the offset angle can consequently in principle be done during the operation of the electric machine, preferably during normal driving operation of a vehicle that is driven by the electric machine, as long as the predefined torque remains constant for a sufficiently long period of time (e.g. 1 ... 2 s). For this purpose, a base current vector that generates the torque desired by a controller is preferably set. An oscillating component is preferably overlaid onto this base current vector, preferably oscillating at a defined frequency and preferably pointing along the line of constant torque. Depending on the deviation between the assumed offset angle and the real value, oscillations of different strength occur in the resulting torque. The assumed offset angle is adjusted preferably until the measured oscillations in the rotor speed are minimum or the amplitude of the oscillations falls below a threshold value. The resulting offset angle at this minimum oscillation is a close approximation to the real offset angle, and is used for the further operation of the control of the electric machine.

Advantageously, a method for calibrating an offset angle of a field-oriented control of an electric machine is provided. It is a control technology solution that minimizes the need for components or mechanical measures. The achievable accuracy is very high in comparison with known solutions, and is preferably independent of the quality of the machine model and its associated data used in the control system. In addition, calibration of the offset angle in driving operation is enabled which, in the best case, i.e. when maladjustment of the offset angle internal to the control system is absent or small, is not perceived by the driver.

In another embodiment of the invention, the calibration of the offset angle depending on the ascertained speed signal, comprises the following steps: changing the offset angle in a positive or negative direction; ascertaining the speed signal of the position encoder; comparing the ascertained speed signal with the previously ascertained speed signal; changing the offset angle in the same direction if the amplitude of the oscillation of the ascertained speed signal is smaller than the speed signal ascertained previously; changing the offset angle in the opposite direction if the amplitude of the oscillation of the ascertained speed signal is greater than with the speed signal ascertained previously; ending the calibration when the amplitude of the oscillation of the ascertained speed signal is smaller than a predefinable first limit value.

Method steps for calibrating the offset angle depending on the ascertained speed signal are provided. The offset angle is changed for this purpose in a positive or negative direction, preferably incrementally, preferably in absolute values of about 0.1 degree up to 1 degree. The further direction for changing the offset angle is determined depending on the comparison between the resulting speed signal and the speed signal ascertained previously, so that the oscillation of the speed signal is minimized iteratively. The method is ended when the amplitude of the oscillation of the ascertained speed signal is lower than a predefinable first limit value. This limit value is calibrated in an application-specific manner, so that an incorrectly set torque, and a risk to the operation of the electric machine or an uncomfortable operation of the electric machine resulting from that, is preferably prevented. A method for the simple calibration of the offset angle depending on the ascertained speed signal is advantageously provided.

In another embodiment of the invention, the method is carried out depending on a second limit value, namely when a predefinable setpoint torque falls below the second limit value.

The second limit value is preferably a very low torque value, preferably close to zero, for example very much smaller than 1 Nm. Lines of constant torque result in the d/q coordinate system, in which the q component of the stator current vector is equal to zero.

A method is advantageously provided for which, preferably, accurate knowledge of the characteristic of the electric machine is not required, since possible errors resulting from an inaccurate machine model can be ruled out.

In another embodiment of the invention, the periodic variation takes place at a frequency that lies within the range of a natural frequency of the electric machine or of a drivetrain with an electric machine. The frequency preferably lies in the region of the first natural frequency of the electric machine or of a drivetrain with an electric machine. Even small resulting oscillations in the torque then lead to larger ascertained oscillations in the rotation speed. The sensitivity of the method is advantageously increased.

In another embodiment of the invention, the periodic variation takes place with amplitudes of different size, depending on the amplitude of the oscillation of the ascertained speed signal.

A periodic variation preferably takes place with a greater amplitude in comparison with the previous variation if the amplitude of the oscillation of the ascertained speed signal falls below a third predefinable limit value. Increasing the amplitude of the varying current vector close to the optimum that is sought for brings about an increased excitation of the oscillation of the speed signal to be ascertained, which falls with a closer distance from the optimum itself.

The sensitivity of the method is advantageously increased in the vicinity of the optimum that is sought for.

In another embodiment of the invention, the calibration of the offset angle takes place depending on an evaluation of the oscillation of the speed signal by means of a gradient method.

To ascertain the oscillation minimum of the rotor rotation speed, the oscillation amplitudes are taken into consideration close to the minimum, and integrated into the evaluation through a gradient method. Preferably, by means of the gradient method close to the minimum, not only is the minimum taken into consideration, but also the change of the gradient of the oscillation in the vicinity of the minimum. The minimum that is sought for is advantageously determined more accurately.

In another embodiment of the invention, the calibration of the offset angle takes place depending on the d-component of a measured phase current. The phase current is measured or ascertained during the method. Preferably, the d-component of the stator current vector is ascertained by means of a search algorithm. The algorithm calculates the compensation angle which is added to the offset angle that is assumed internally in the control system. The phase shift between the harmonic component that is modulated on in the d-component of the stator current vector and the resulting harmonic component in the rotor frequency is used here in order to calculate the optimum compensation angle with the aid of a controller. An alternative method is advantageously provided.

In another embodiment of the invention, the electric machine is configured as a drive aggregate of a vehicle, and the method is carried out when the vehicle is stationary.

The method is carried out when a vehicle is stationary, wherein a machine that is to be controlled is employed as a drive. The drive wheels of the vehicle are preferably locked by the mechanical brakes for this purpose. Depending on the nature of the mechanical drivetrain, activation when stationary can have a favorable effect on the achievable accuracy, since the position encoder signal only contains oscillations generated by the oscillating current vector, and is not additionally overlaid by a rotary movement that can contain its own oscillations due to changing load torques. A method for the calibration of the offset angle with particularly high accuracy is advantageously provided.

The invention further relates to a computer program that comprises commands which, when executed by a computer, cause this to carry out the steps of the method described previously.

The invention further relates to a computer-readable storage medium comprising commands which, when executed by a computer, cause this to carry out the steps of the method described previously.

The invention further relates to a device for calibrating an offset angle of a field-oriented control of an electric machine between an angle signal of a position encoder of an electric machine and the direction of the rotor flux of an electric machine. The device is configured to vary a current vector periodically along a line of a constant torque and, preferably, to specify this current vector Is for operation of the electric machine, to ascertain a speed signal of the electric machine and to calibrate the offset angle depending on the ascertained speed signal. Preferably the speed signal is ascertained depending on the angle signal of the position encoder.

A device for calibrating an offset angle of a field-oriented control of an electric machine is advantageously provided. The achievable accuracy is very high when compared with known solutions, and is preferably independent on the quality of the machine model and its associated data used in the control system.

The invention further relates to a drivetrain and a device as described and, in particular with power electronics and/or an electric drive. A drivetrain of this type serves, for example, to drive an electric vehicle. Secure operation of the drivetrain is enabled by means of the method and the device.

The invention further relates to a vehicle with a drivetrain as described. Advantageously, a vehicle is thereby provided that comprises a device with which an offset angle of a field-oriented control of an electric machine can be calibrated.

It should be obvious that the features, properties and advantages of the method according to the invention apply or can be applied to the device of the drivetrain and the vehicle, and vice versa.

BRIEF DESCRIPTION OF THE DRAWINGS

Further features and advantages of embodiments of the invention emerge from the following description with reference to the appended drawings.

The invention is to be explained in more detail below with reference to figures in which.

DETAILED DESCRIPTION

Figure 1:
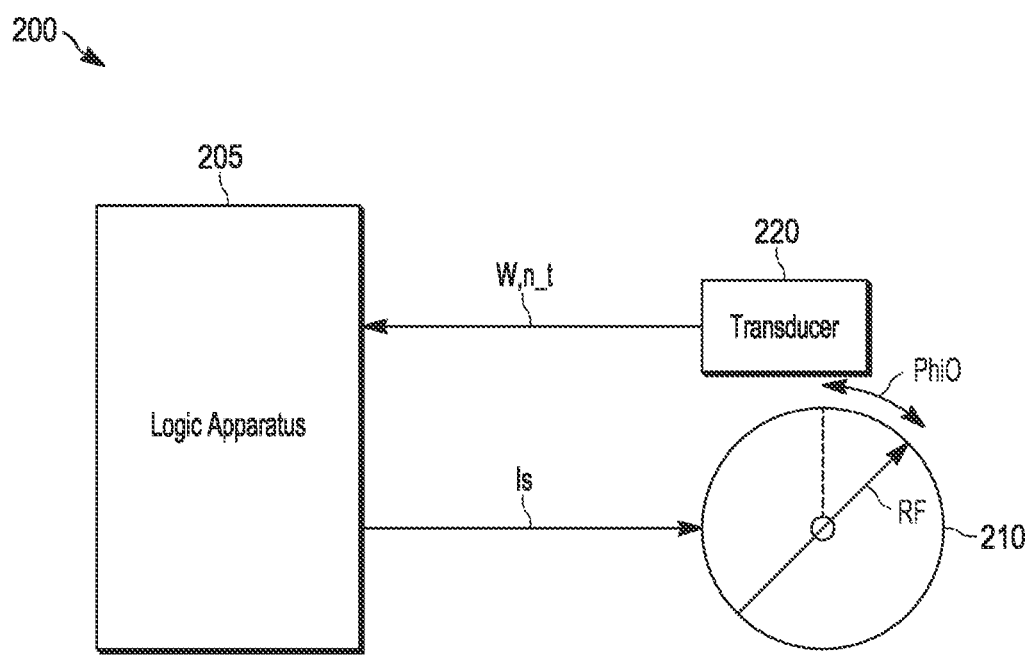
FIG. 1 shows a schematic illustration of a device for calibrating an offset angle of a field-oriented control of an electric machine.

FIG. 1 shows a device 200, preferably with a logic apparatus 205, for calibrating an offset angle PhiO of a field-oriented control of an electric machine 210 between an angle signal W of a position encoder 220 of the electric machine and the direction of the rotor flux RF of the electric machine. The device 200 is configured to vary a current vector Is periodically along a line of a constant torque, and preferably to specify this current vector Is for drive and for operation of the electric machine. The device 200 is further configured to ascertain a speed signal n_t of the electric machine 210 that preferably results from the angle signal W of the position decoder 220, and to calibrate the offset angle PhiO depending on the ascertained speed signal n_t.

Figure 2:
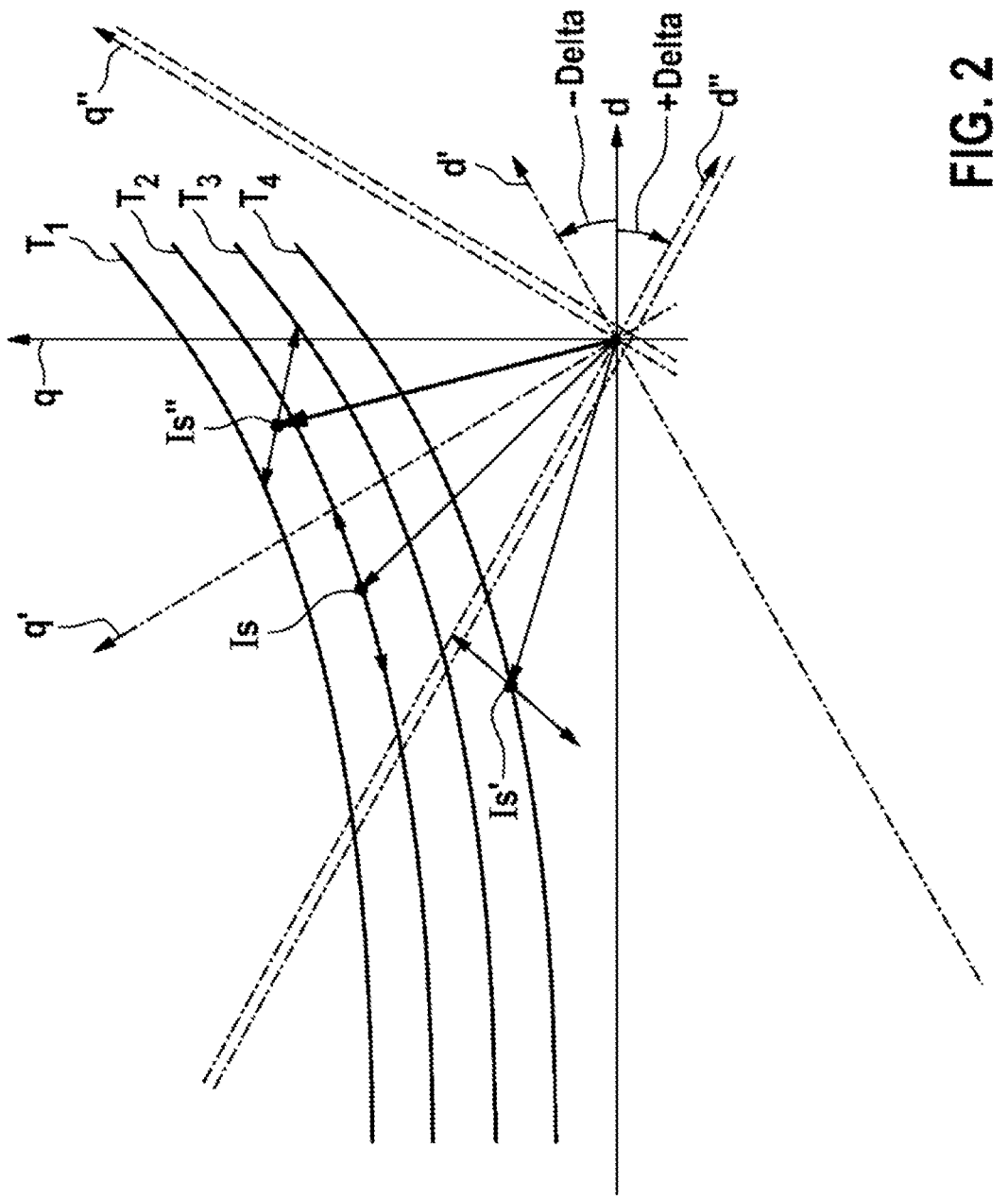
FIG. 2 shows a d/q diagram of a field-oriented control.

FIG. 2 shows a d/q diagram of a field-oriented control. This d/q diagram is overlaid by two further diagrams, a d'/q' and a d"/q" diagram. This serves to illustrate graphically the effect of a deviation (+/−delta) between the real offset angle and the assumed offset angle. Alternating values (for example alternating voltages and alternating currents with which an electric machine is supplied) that are assumed to be largely sinusoidal are transferred in the d/q diagram to a coordinate system rotating at the frequency of the alternating values. When the electric machine is in steady-state operation, constant values result in the rotating coordinate system from the alternating values. In the d/q coordinate system, which rotates synchronously with the rotor flux and whose d-axis points in the direction of the rotor flux, a stator current is represented as a stator current vector, characterized by its magnitude and its direction. This current vector rotates synchronously with the rotating stator or rotor flux of the electric machine. Machine-specific lines T1, T2, T3, T4, along which the electric machine outputs a constant torque, can be represented in this coordinate system. A control system of an electric machine can access the parameters of these lines by means of characteristic diagrams or parameterizable data. The different operating point of these lines can be set by varying the stator current vector Is with different Isd and Isq components. In a step of the method, operating points are set along this constant torque line by periodically varying the current vector Is. If the offset angle assumed by the control system is correct, the torque that is output here remains constant and so also, consequently, does the rotation speed of the electric machine. The overlaid d'/q' and d"/q" diagram show, by way of example, how the position of the current vector Is changes from the illustrated current vector Is" or Is' depending on an erroneous offset angle with a deviation of +/−delta. With corresponding variation of the current vectors Is" and Is', the set values no longer lie on the lines T1, T2, T3, T4 of constant torque. When the assumed offset angle is erroneous, the operating points that actually are set lie next to the lines of constant torque. A periodic oscillation of the torque results, which causes a periodic oscillation in the rotation speed of the electric machine. In a further step, the resulting rotation speed, or the profile of the rotation speed, is ascertained as a speed signal. The offset angle is calibrated depending on the speed signal. The value of the offset angle is preferably varied for this purpose, until an amplitude of the speed signal during the variation of the current vector Is falls below a threshold value. The offset angle obtained in this way is a good approximation to the real value. To vary the current vector Is, a base current vector is preferably set, which generates a torque desired by a controller. An oscillating component is preferably overlaid onto this base current vector, preferably oscillating with a defined frequency and preferably pointing in the direction of the line of constant torque. Depending on the deviation of the assumed offset angle from the real value, oscillations of different strength are caused in the resulting torque. The assumed offset angle is adjusted until, preferably, the measured oscillations in the rotor rotation speed become minimum, or the amplitude of the oscillations fall below a threshold value. The resulting offset angle at this minimum oscillation is a good approximation to the real offset angle, and is used for the further operation of the control system of the electric machine.

Figure 3:
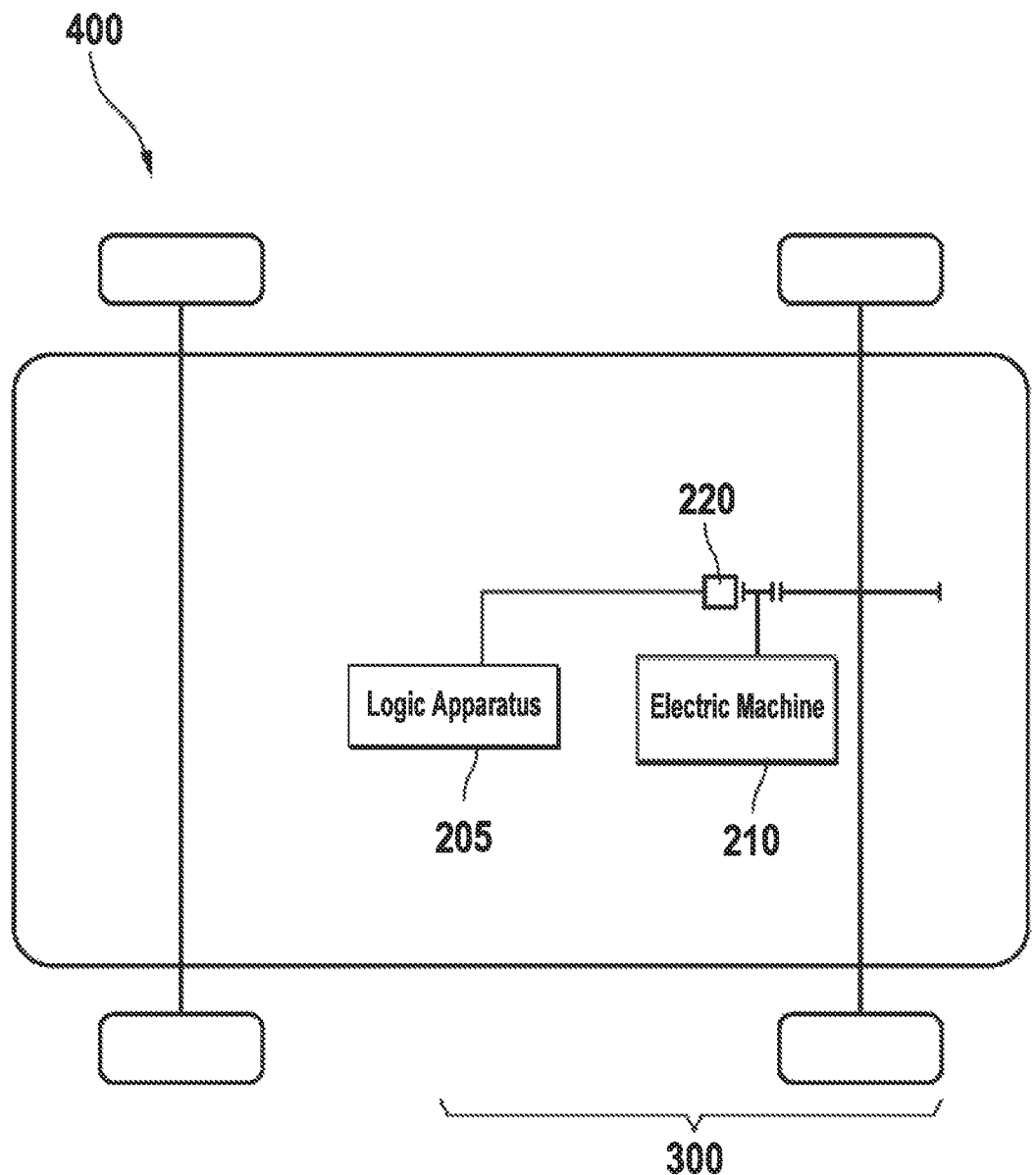
FIG. 3 shows a schematically illustrated vehicle with a drivetrain.

FIG. 3 shows a schematically illustrated vehicle 400 with a drivetrain 300. The drivetrain comprises a device for calibrating an offset angle (PhiO) of a field-oriented control of an electric machine (210).

Figure 4:
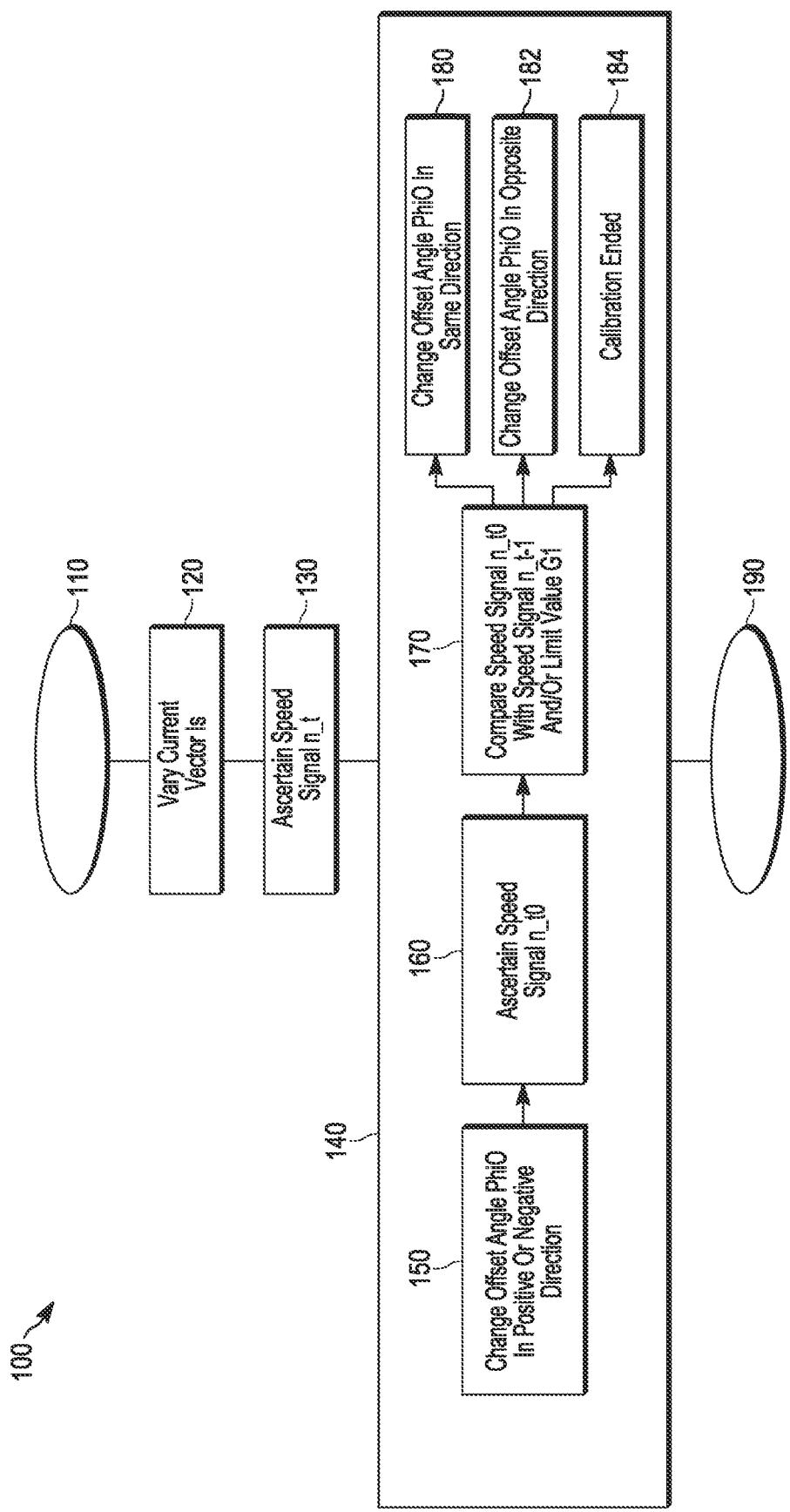
FIG. 4 shows a schematically illustrated flow diagram of a method for calibrating an offset angle of a field-oriented control of an electric machine.

FIG. 4 shows a schematic flow of a method 100 for calibrating an offset angle PhiO of a field-oriented control of an electric machine 210 between an angle signal W of a position encoder 220 of an electric machine and the direction of the rotor flux RF of an electric machine. The method starts at step 110. In step 120, a current vector Is is varied periodically along a line of constant torque. Depending on this predefined current vector, the electric machine 210 is driven or operated. In step 130, a speed signal n_t of the position encoder 220 of the electric machine 210 is ascertained. Following this, in step 140, depending on the ascertained speed signal n_t, the offset angle PhiO is calibrated. Preferably, in step 150, the offset angle PhiO is changed in a positive or negative direction. And, in step 160, the speed signal n_t0 is ascertained by means of the position encoder. A comparison of the ascertained speed signal n_t0 with the previously ascertained speed signal n_t−1 then follows, and/or a comparison of the ascertained speed signal n_t0 with a first, predefinable limit value G1 follows in step 170. A change in the offset angle PhiO in the same direction takes place in step 180 if the amplitude of the oscillation of the ascertained speed signal n_t0 is smaller than with the previously ascertained speed signal n_t−1; a change in the offset angle PhiO in the opposite direction takes place in step 182 if the amplitude of the oscillation of the ascertained speed signal n_t0 is larger than with the previously ascertained speed signal n_t−1. Following step 180 or step 182, the method preferably branches to step 160. The calibration is ended in step 184 if the amplitude of the oscillation of the ascertained speed signal n_t0 is lower than the predefinable first limit value G1. The method ends at step 190.

The invention claimed is:

1. A method (100) for calibrating an offset angle (PhiO) of a field-oriented control of an electric machine (210) between an angle signal (W) of a position transducer (220) and the direction of the rotor flux (RF), the method comprising the following steps:
    periodically varying (120) a current vector (Is) along a line of constant torque in a d/q coordinate system of field-oriented control;
    ascertaining (130) a speed signal (n_t) of the position transducer of the electric machine (210); and
    calibrating (140) the offset angle (PhiO) depending on the ascertained speed signal (n_t).

2. The method as claimed in claim 1, wherein the calibration (140) of the offset angle (PhiO) depending on the ascertained speed signal (n_t) comprises the following steps:
    changing (150) the offset angle (PhiO) in a positive or negative direction;
    ascertaining (160) the speed signal (n_t0) of the position encoder;
    comparing (170) the ascertained speed signal (n_t0) with the previously ascertained speed signal (n_t−1);
    changing (180) the offset angle (PhiO) in the same direction if the amplitude of an oscillation of the ascertained speed signal (n_t0) is smaller than with the previously ascertained speed signal (n_t−1);
    changing (182) the offset angle (PhiO) in the opposite direction if the amplitude of the oscillation of the ascertained speed signal (n_t0) is larger than with the previously ascertained speed signal (n_t−1); and
    ending the calibration (184) if the amplitude of the oscillation of the ascertained speed signal (n_t0) is smaller than a predefinable first limit value (G1).

3. The method as claimed in claim 1, wherein the method (100) is carried out depending on a second limit value (G2), wherein the method (100) is carried out if a predefinable setpoint torque (Td) exceeds a second limit value (G2).

4. The method as claimed in claim 1, wherein the periodic variation (120) takes place at a frequency (F) that lies in a range of a natural frequency (Fe) of the electric machine (210) or of a drivetrain (300) with an electric machine (210), and lies in a range of the first natural frequency (Fe1) of the electric machine (210) or of a drivetrain (300) with an electric machine.

5. The method as claimed in claim 1, wherein the calibration (140) of the offset angle (PhiO) takes place depending on an evaluation of an oscillation of the speed signal (n_t) by means of a gradient method.

6. The method as claimed in claim 1, wherein the calibration (140) of the offset angle (PhiO) takes place depending on a d-component of a measured phase current (Iph).

7. The method as claimed in claim 1, wherein the electric machine (210) is designed as a drive aggregate of a vehicle, wherein the method is carried out when the vehicle is stationary.

8. A non-transitory, computer-readable medium, comprising commands which, when executed by a computer, cause the computer to calibrate an offset angle (PhiO) of a field-oriented control of an electric machine (210) between an angle signal (W) of a position transducer (220) and the direction of the rotor flux (RF), by:
    periodically varying (120) a current vector (Is) along a line of constant torque in a d/q coordinate system of field-oriented control;
    ascertaining (130) a speed signal (n_t) of the position transducer of the electric machine (210); and
    calibrating (140) the offset angle (PhiO) depending on the ascertained speed signal (n_t).

9. A device (200) for calibrating an offset angle (PhiO) of a field-oriented control of an electric machine (210) between an angle signal of a position encoder (220) and the direction of the rotor flux (RF), wherein the device (200) is configured to:
    vary a current vector (Is) periodically along a line of a constant torque in a d/q coordinate system of field-oriented control;
    ascertain a speed signal (n_t) of the position encoder of the electric machine (210) and
    calibrate the offset angle (PhiO) depending on the ascertained speed signal (n_t).

* * * * *